United States Patent [19]
Guggenbühl

[11] 3,887,868
[45] June 3, 1975

[54] MEASURING DEVICE FOR DETERMINING THE CONCENTRATION AND THE MEAN PARTICLE SIZE OF PARTICLES SUSPENDED IN AN ELECTROLYTICALLY CONDUCTIVE LIQUID

[75] Inventor: Walter Guggenbühl, Zurich, Switzerland

[73] Assignee: Contraves AG, Zurich, Switzerland

[22] Filed: Sept. 4, 1973

[21] Appl. No.: 394,125

[30] Foreign Application Priority Data
Sept. 14, 1972 Switzerland............... 13434/72

[52] U.S. Cl. .................. 324/71 CP; 235/92 PC
[51] Int. Cl. ........................................ G01n 27/00
[58] Field of Search ............. 235/92 PC; 324/71 CP

[56] References Cited
UNITED STATES PATENTS

| | | | |
|---|---|---|---|
| 3,439,267 | 4/1969 | Coulter et al. | 324/71 CP |
| 3,473,010 | 10/1969 | Bloomfield et al. | 324/71 CP X |
| 3,626,164 | 12/1971 | Pontigny et al. | 324/71 CP X |

Primary Examiner—Alfred E. Smith
Assistant Examiner—Rolf Hille
Attorney, Agent, or Firm—Werner E. Kleeman

[57] ABSTRACT

A measuring device for determining the concentration and mean volume of particles suspended in an electrolytically conductive liquid, comprising a conductivity cell having a capillary restriction and incorporating means for generating pulses upon passage of the particles suspended in the liquid through said conductivity cell. A circuit is operatively connected with the conductivity cell for evaluating and counting the pulses. This circuit incorporates pulse counter means for counting pulses generated by the particles passing through the conductivity cell, and auxiliary counter means for counting a predetermined number of the pulses produced by the particles, means for determining the mean particle volume, and means for correction of the determined mean particle volume to correct the same to provide an indication of the actual mean particle volume while taking into account the probability of simultaneous throughpassage of more than one particle through the capillary restriction of the conductivity cell.

1 Claim, 1 Drawing Figure

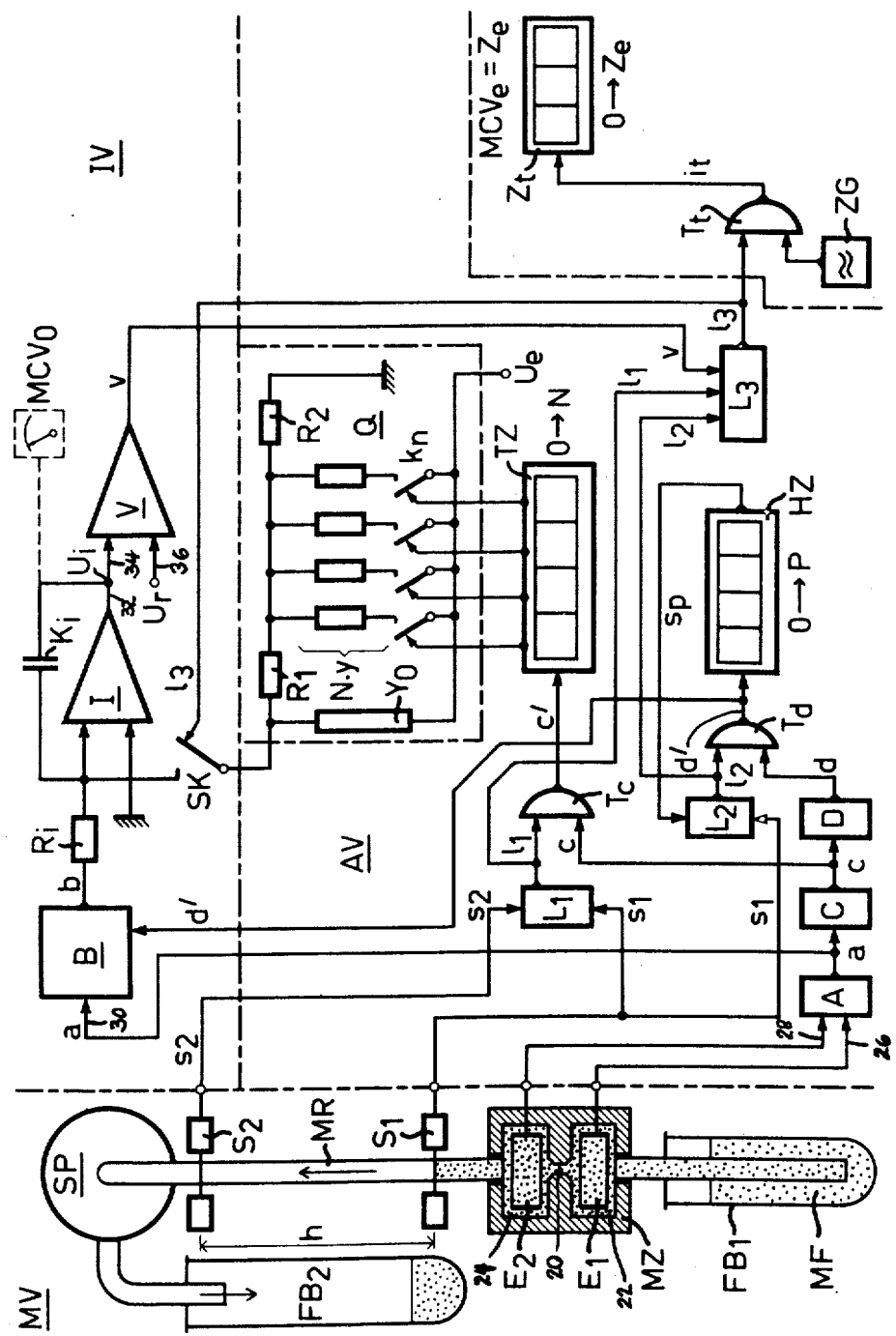

ced in the com-3,887,868

MEASURING DEVICE FOR DETERMINING THE CONCENTRATION AND THE MEAN PARTICLE SIZE OF PARTICLES SUSPENDED IN AN ELECTROLYTICALLY CONDUCTIVE LIQUID

BACKGROUND OF THE INVENTION

The present invention relates to a measuring device for determining the concentration and mean or average volume of particles suspended in an electrolytically conductive liquid, these particles during passage through a capillary restriction located between two electrode compartments of a conductivity cell generating corresponding resistance fluctuations which after conversion into appropriate pulses are counted at a particle counter and a predetermined number P of which are each added or summed with the aid of a storage- and integration device with their peak voltage values $\hat{E}$ during a time $\Delta t$ for forming a capacitor terminal voltage corresponding to the mean particle volume $MCV_o$, and wherein the capacitor terminal voltage can be expressed by the function:

$$U_i = k_1 \cdot d' \sum_{o}^{P} (\hat{E} \cdot \Delta t)_{d'} = \infty \cdot MCV_o$$

wherein $k_1 = 1/R_i K_i$

The aforementioned capacitor terminal voltage $U_i$ at least for larger particle concentrations possesses much too high a value for the mean particle volume, because during simultaneous passage of more than one particle through the capillary restriction the conductivity cell, instead of generating a corresponding number of pulses of normal peak amplitude $\hat{E}$ only generates one pulse of correspondingly increased peak amplitude. The probability of the occurrence of a coincidence pulse increases in accordance with the particle concentration, that is to say, the number N of particles contained in a unit volume of liquid sample, and in proportion to the function $(1+qN)$, wherein $q$ is a constant which is to be empirically determined.

SUMMARY OF THE INVENTION

It is a primary object of the present invention to automatically provide in digital form an appropriately corrected measurement value $MCV_1$ for the mean or average particle volume.

Now in order to implement this object and others which will become more readily apparent as the description proceeds, the invention contemplates that following determination of the total number N of particles at the particle counter and which particles are contained in a predetermined volume of sample liquid and after reaching the number P in an auxiliary counter the capacitor voltage of a charged capacitor is discharged with a discharge current $i_e$ which is increased by the factor $(1+qN)$ while digitally measuring and indicating the discharge time, which is expressed by the function.

$$Ze = k_1 U_i/i_{eo}(1+qN)$$

so that as a measurement value for the true or actual mean particle volume there can be indicated at a time measuring device, while taking into account the probability of simultaneous throughpassage of more than one particle through the capillary restriction of the conductivity cell, a reduced measurement value which can be expressed by the function:

$$Ze = MCV_1 = MCV_o/(1+qN)$$

There is preferably ensured that the discharge of the charged capacitor occurs from a voltage source $U_e$ via a resistance network, the basic conductance value of which can be varied by switching-in additional conductance values controlled by the particle counter according to the function $Y = Y_o(1+qN)$, so that the discharge current corresponds to the function:

$$i_e = Y_o(1+qN) \cdot U_e$$

BRIEF DESCRIPTION OF THE DRAWING

The invention will be better understood and objects other than those set forth above will become apparent when consideration is given to the following detailed description thereof. Such description makes reference to the annexed drawing wherein the single FIGURE schematically illustrates a preferred constructional embodiment of measuring device for particles suspended in an electrolytically conductive liquid and designed according to the teachings of the present invention.

DETAILED DESCRIPTION OF THE PREFERRED EMBODIMENTS

Describing now the drawing, the exemplary embodiment of measuring device will be understood to comprise a measuring apparatus MV for the detection of particles, typically for instance blood cells, suspended in a predetermined volume of an electrolytically conductive measuring liquid MF, the particle detection occurring in the form of pulse-like fluctuations of a mean or average direct-current voltage.

For this purpose there is conveyed in conventional manner the measuring or measurement liquid MF from a sample flask or container $FB_1$ with the aid of a suction pump SP through a conductivity or measuring cell MZ and a calibrated measurement tube MR into a second collecting container or flask $FB_2$. The conductivity cell MZ contains a capillary restriction 20 between two widened portions or electrode chambers 22 and 24, each of which contains a respective electrode $E_1$ and $E_2$, the cross-sectional area of the capillary restriction 20 being about three to ten times as large as the mean or average diameter of the particles suspended in the measurement liquid MF. As the calibrated measuring tube MR there are arranged at a predetermined spacing or distance $h$ from one another two electro-optical peak detector devices $S_1$ and $S_2$ respectively. These detector devices $S_1$ and $S_2$ are constructed such that upon throughpassage of the sample liquid there is switched a respective electrical signal $s_1$ and $s_2$ from the logic condition NO into the logic condition YES. The signal $s_1$ thus can be employed as a start signal and the signal $s_2$ as a stop signal for the respective start and stop of a volume measurement operation, wherein the liquid volume which has flowed through during this time is equal to the product of the internal cross-sectional area of the measuring tube MR and the distance $h$. Particle counters of the aforementioned type are well known in the art and have been disclosed for instance in the commonly assigned U.S. Pat. No. 3,577,162, granted May 4, 1971 and United States application, Ser. No. 194,387 filed Nov. 1, 1971, incorporated herein by reference and to which reference may be readily made.

The electrodes $E_1$ and $E_2$ of the conductivity cell MZ are electrically coupled with the inputs 26 and 28 of a pulse forming device A provided at an evaluation device AV constructed such that while eliminating the direct-current voltage superimposed upon the potential fluctuations at both electrodes $E_1$, $E_2$ there is formed for each voltage fluctuation a shape- and time-correct measurement pulse $a$. All of the measurement pulses $a$ emanating from the pulse forming device A are delivered to a signal generating device or signal generator C which serves the purpose that for each pulse $a$, the amplitude of which exceeds a predetermined minimum peak value, but does not exceed a predetermined maximum peak value and the time-duration of which exceeds a minimum time value, there is produced a useful logical signal $c$ of appropriate duration. Each of these useful signals $c$ thus indicate the throughpassage of a respective particle through the capillary restriction 20 of the conductivity cell MZ, whereas for instance when there occur induced disturbances or air bubbles there will not be generated any useful signal $c$. The useful signals $c$ emanating from the signal generator C are delivered to a logical gate $T_c$ which is opened by means of a logical control signal $l_1$ delivered by a logic mechanism $L_1$, provided that the start signal $s_1$ has assumed the logical value YES and the stop signal $s_2$ still has the logical value NO, i.e., $l_1 = s_1 \bar{s}_2$.

Thus, during the time of throughpassage of the liquid level through the device $S_2$ there appears at the output of the logic gate $T_c$ for each particle a useful signal $c'$ which is to be counted. These signals are continuously counted at the counter TZ. The counter state N attained at the counter TZ until the occurrence of the stop signal $s_2$ thus corresponds to the particle count for a unit volume of measurement liquid MF. The useful signals $c$ are also delivered to a signal generating device D which only further transmits from such signals those signals in the form of output signals $d$ which appear after the expiration of a minimum waiting time $\Delta t$ ($\approx 1$ msec) since the decay of the preceding useful signal $c$. The minimum waiting time $\Delta t$ between two successive signals $d$ is considerably greater than the pulse width of the useful signals $c$. The signals $d$ are delivered to a gate $T_d$ which is opened through the action of the logic circuit $L_2$ and its output signal $l_2$, when the start signal $s_1$ is present and there is not yet present an auxiliary stop signal $s_p$ from the output of the auxiliary counter HZ. The auxiliary stop signal $s_p$ then assumes the logic value YES when the state of the auxiliary counter HZ has reached a predetermined value P. The control signal $l_2$ thus corresponds to the condition $l_2 = s_1 \cdot \bar{s}_p$. Thus, all of the signals $d$, which appear after the occurrence of the start signal $s_1$, are counted as signals $d'$ at the auxiliary counter HZ, as long as the predetermined final state P (for instance 10,000) of the auxiliary counter HZ has not yet been reached.

These signals $d'$ are also delivered to a pulse amplitude storage B of an integration device IV. All of the pulses $a$ emanating from the pulse forming device A are delivered to the main input 30 of the pulse amplitude storage B, these pulses truly corresponding in time and shape to the current- and voltage fluctuations appearing at the inputs 26, 28 of the pulse forming device A. The pulse amplitude storage B is constructed to store from those pulses $a$, for which there is simultaneously also generated a signal $d'$, the peak voltage $\hat{E}$ during a respective fixed integration time $t$, so that there are generated square wave pulses $b$ having a fixed duration $\Delta t$ and an amplitude corresponding to the peak value $\hat{E}$ of each respective pulse $a$. These pulses $b$ are delivered via a resistor $R_i$ to an integration amplifier I equipped with a capacitor $K_i$. Such serves to deliver to the capacitor $K_i$ during the duration $\Delta t$ of each pulse $b$ a current $i_1 = \hat{E}/R_i$, that is to say, to deliver to the capacitor $K_i$ a charge $\hat{E} \cdot \Delta t/R_i$, so that at the output of the amplifier I there is formed from the predetermined number P of evaluated pulses $a$, for which also there appears a respective signal $d'$, a voltage of a value which can be expressed by the function:

$$U_i = k_1 \cdot d' \sum_{0}^{P} (\hat{E} \cdot \Delta t)_d, \text{ wherein } k_1 = \frac{1}{R_i \cdot K_i}$$

This voltage $U_i$ constitutes an analog value for a mean particle volume $MZV_o$ because the individual peak amplitudes $\hat{E}$ of the respective pulses $a$ integrated over a predetermined time duration $\Delta t$ correspond to the volume of the effective particles and the terminal or final value $U_i$ represents the sum of a fixed number P of such pulses. The heretofore described components of the apparatus depicted in the drawing are disclosed in greater detail in the copending United States application Ser. No. 288,421, filed Sept. 12, 1972, and entitled "Method And Apparatus For Producing A Magnitude Proportional To The Average Amplitude Of A Multiplicity Of Input Pulses," to which reference may be readily had and incorporated herein by reference.

According to the objectives of the invention there should be derived from the value $U_i = \alpha \cdot MCV_o$ a corrected value in digital form expressed by the function:

$$MCV_1 = MCV_o/(1+qN),$$

wherein the particle number N per unit volume of the measuring liquid is taken into account in order to take into consideration the probability that in the restricted capillary portion of the conductivity cell MZ—and which probability increases with increasing particle concentration as previously explained— two or more particles can pass simultaneously therethrough and instead of generating two or more pulses $a$ of normal peak amplitude $\hat{E}$ there only will be produced a respective pulse $a$ of a multiple peak amplitude $\hat{E}$, in other words too large a value $MZV_o$ for the mean particle volume will be simulated. The value of the correction constant $q$ can be empirically determined.

For the realization of this objective the output 32 of the integration amplifier I, which contains the capacitor $K_i$ which is to be charged to the value $U_i$, is connected with an input 34 of a comparator V, at the other input 36, of which there is applied a reference voltage $U_r$. The comparator amplifier V generates an output signal $v$ representing the logical value YES during the time when the input voltage $U_i$ assumes a value $U_i > U_R$, and this signal becomes zero i.e., assumes the logical value NO as soon as $U_i \leq U_r$, i.e., as the starting condition there is required the integration $U_i = U_r$. A signal $l_3$ generated in a logic element $L_3$ corresponds to the following conditions: $l_3 = l_1 \cdot l_2 \cdot v$, that is to say, the signal $l_3$ assumes the logical value YES when the total particle number N determined at the counter TZ has reached the number P in the auxiliary counter HZ and $U_i > U_r$.

A control contact SK which can be closed by means of the logical signal $l_3$ in its closed state connects a resistance network or element Q with a voltage $U_e$, which possesses the opposite polarity in relation to the pulses $b$, so as during closing of the switch SK to discharge the capacitor $K_i$ with a current which can be expressed by the function:

$i_e = U_e \cdot Y_e$ ($Y_e$ = conductance value of the element Q).

The discharge time for the decay of the voltage $U_i$ to the value $U_r$ can be expressed by the function:

$$Z_e = \frac{d' \sum_{o}^{p} (\hat{E}_b \cdot \Delta t) d'}{R_i \cdot K_i} \cdot \frac{K_i}{i_e} = \frac{U_i \cdot K_i}{Y_e \cdot U_e}$$

It can be portrayed in known manner in digital form in that during the discharge time $Z_e$ clock or timing impulses $i_t$ of constant frequency are delivered from a clock pulse generator ZG to a timer or clock counter $Z_t$. The clock or timing pulses $i_t$ from the clock pulse generator ZG are delivered via a gate $T_t$, which is opened by the signal $l_3$ which close the switch SK.

Thus, the discharge time $Z_e$ of the capacitor $K_i$ which can be expressed by the function:

$Z_e = U_i \cdot K_i/i_e = U_i \cdot K_i/Y_e \cdot U_e = Z_o/(1+qN)$, wherein, $Z_o = U_i \cdot K_i/i_o = U_i \cdot K_i/Y_{eo} \cdot U_e$, corresponds to the discharge time $Z_e = Z_o/(1+qN)$ indicated at the clock or timing counter $Z_t$, which also portrays the correct value of the mean or average particle volume.

Basically it is possible to generate discharge currents $i_e = i_{eo}(1+qN)$ and also voltages $U_e = U_{eo}(1+qN)$ as a function of a digital value N, so that therewith there can be also carried out with a fixed conductivity value $Y_o$ of the resistance circuit Q the desired correction which can be expressed as follows:

$Z_e = U_i/i_{eo}(1+qN) = Z_o/i_{eo}$

The resistance circuit Q which has been depicted in the drawing however allows attainment of the stated objective with minimum expenditure. Thus, from the counter TZ, in accordance with its counter state N there is added, via the contacts $k_n$ controlled by the counter, to a fixed conductance value $Y_o$, an additional conductance value Y of the total value N·y, wherein by means of the resistances or resistors $R_1$ and $R_2$ there can be set a suitable current distribution.

The resultant conductivity value $Y_o \cdot (1+qN) = Y_o \cdot (1 + R_2/R_1 + R_2 \cdot N_y/y_o)$ is thus made identical to the empirically determined correct value $U_i/U_e \cdot Y_{eo} (1+qN)$.

While there is shown and described present preferred embodiments of the invention, it is to be distinctly understood that the invention is not limited thereto but may be otherwise variously embodied and practiced within the scope of the following claims. Accordingly,

What is claimed is:

1. An apparatus for measuring the mean volume of a multiplicity of particles contained in an electrolytically conductive suspension liquid, comprising, in combination:
   a. means defining a capillary restricted measurement path arranged between two electrodes;
   b. a particle detector device incorporating means for propelling the suspension liquid through the capillary restricted measurement path;
   c. pulse generator means for generating for each particle which passes through the measurement path a particle pulse with a peak amplitude proportional to the particle volume;
   d. a particle pulse counting mechanism for indicating the sum of the particles contained in a predetermined volume of suspension liquid;
   e. pulse counting and selection means for converting only such particle pulses which, with regard to a preceding particle pulse possess a minimum spacing in time, into square wave pulses of appropriate peak amplitude and predetermined non-variable duration;
   f. a square wave pulse integration mechanism for the integrating charging of a capacitance to a final voltage which is proportional to the peak amplitude summation of all integrated square wave pulses;
   g. an auxiliary counting mechanism for counting all integrated square wave pulses until reaching a predetermined final numerical value;
   h. means for the automatic placing into standstill the integration operation of the integration mechanism upon reaching a predetermined final counter state of the auxiliary counter mechanism and for connecting the capacitance to a discharge current circuit upon termination of the counting function of the particle pulse counting mechanism;
   i. means for the automatic parallel circuit connection of additional conductance values at a basic conductance value of a discharge current circuit in functional dependency of the attained counter state of the particle pulse counter mechanism; and
   j. means for measuring the discharge time of the capacitance as an actual time value which is proportional to the mean particle volume.

* * * * *